US009787557B2

(12) United States Patent
Leblanc et al.

(10) Patent No.: US 9,787,557 B2
(45) Date of Patent: Oct. 10, 2017

(54) DETERMINING SEMANTIC PLACE NAMES FROM LOCATION REPORTS

(71) Applicant: Google Inc., Mountain View, CA (US)

(72) Inventors: Gabriel Leblanc, Sunnyvale, CA (US); Robert Malcolm Fraser, Sunnyvale, CA (US); Min-yian Su, Sunnyvale, CA (US); Jesse Rosenstock, New York, NY (US); Bhaskar Mehta, Menlo Park, CA (US); Tanmay Sanjay Khirwadkar, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 14/697,733

(22) Filed: Apr. 28, 2015

(65) Prior Publication Data

US 2016/0323159 A1    Nov. 3, 2016

(51) Int. Cl.
*G06F 15/173* (2006.01)
*H04L 12/26* (2006.01)
(Continued)

(52) U.S. Cl.
CPC ...... *H04L 43/065* (2013.01); *G06F 17/30241* (2013.01); *G06F 17/30864* (2013.01);
(Continued)

(58) Field of Classification Search
CPC . H04L 43/065; H04L 67/18; G06F 17/30876; G06F 17/30864;
(Continued)

(56) References Cited

U.S. PATENT DOCUMENTS 8,275,649 B2    9/2012  Zheng et al.
8,589,069 B1 *  11/2013 Lehman ................. G01C 21/20
                                                340/995.1
(Continued)

FOREIGN PATENT DOCUMENTS

WO    WO 2013/192583    12/2013
WO    WO 2014/004532     1/2014

OTHER PUBLICATIONS

Adomavicius et al., "Incorporating Contextual Information in Recommender Systems Using a Multidimensional Approach", ACM Transactions on Information Systems, vol. 23, No. 1, Jan. 2005, pp. 103-145.
(Continued)

*Primary Examiner* — Padma Mundur
(74) *Attorney, Agent, or Firm* — Dority & Manning, P.A.

(57) ABSTRACT

Systems and methods for determining semantic place names from one or more location reports received from a user device are provided. High quality visits for a candidate semantic place location from a plurality of previously obtained location reports can be aggregated and used to generate a point cloud for the semantic place location. A high quality visit can correspond to a visit by a device that is determined to be associated with a candidate semantic place location with greater likelihood relative to a plurality of other candidate semantic place locations. Data associated with one or more point clouds can be accessed and used to support determinations of semantic place name for one or more location reports. In example embodiments, the semantic place name can be stored as part of a location history and/or provided for display in a user interface presented on a display device.

17 Claims, 8 Drawing Sheets

(51) Int. Cl.
 G06Q 10/10 (2012.01)
 G06Q 30/02 (2012.01)
 G06F 17/30 (2006.01)
 H04L 29/08 (2006.01)
(52) U.S. Cl.
 CPC ....... *G06F 17/30876* (2013.01); *G06Q 10/10* (2013.01); *G06Q 30/02* (2013.01); *G06Q 30/0261* (2013.01); *H04L 67/18* (2013.01)
(58) Field of Classification Search
 CPC .......... G06F 17/30241; G06Q 30/0261; G06Q 10/10; G06Q 30/02
 See application file for complete search history.

(56) References Cited

U.S. PATENT DOCUMENTS

| | | |
|---|---|---|
| 2006/0101377 A1 | 5/2006 | Toyama et al. |
| 2006/0266830 A1 | 11/2006 | Horozov et al. |
| 2007/0218900 A1 | 9/2007 | Abhyanker |
| 2008/0015928 A1 | 1/2008 | Chandra |
| 2008/0154888 A1* | 6/2008 | Buron .................. G06F 17/3087 |
| 2008/0243821 A1 | 10/2008 | Delli Santi et al. |
| 2010/0153292 A1 | 6/2010 | Zheng et al. |
| 2011/0276565 A1 | 11/2011 | Zheng et al. |
| 2012/0233158 A1* | 9/2012 | Braginsky ............... H04L 67/18 707/724 |
| 2013/0086072 A1 | 4/2013 | Peng et al. |
| 2013/0344898 A1* | 12/2013 | Hawkins ................ H04W 4/02 455/456.3 |
| 2014/0106785 A1 | 4/2014 | Hawkins et al. |
| 2015/0073711 A1 | 3/2015 | Brewington et al. |

OTHER PUBLICATIONS

Adomavicius et al., "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.
Angie's List, Wikipedia, http://en.wikipedia.org/wiki/Angie%27s_List, retrieved on Aug. 10, 2011, 4 pages.
Caron et al., "Groupanizer: a Method to Correlate Multi-Users Position with Daily Moments", Proceedings of the Fourth Annual IEEE International Conference on Pervasive Computing and Communications Workshops, Pisa, Italy, Mar. 13-17, 2006, 6 pages.
Citysearch, http://www.citysearch.com, retrieved on Aug. 10, 2011, 1 page.
Citysearch, Wikipedia, http://www.en.wikipedia.org/wiki/Citysearch, retrieved on Aug. 10, 2011, 3 pages.
Foursquare, https://foursquare.com/, retrieved on Aug. 11, 2011, 1 page.
Four Square (Disambiguation), Wikipedia, http://en.wikipedia.org/wiki/Four_square_(disambiguation), retrieved on Aug. 11, 2011, 1 page.
Google Answers: View Questions in Computers, http://answers.google.com/answers/browse/1200.html, retrieved on Aug. 10, 2011, 3 pages.
Google Maps, http://maps.google.com, retrieved on Aug. 10, 2011, 1 page.
Liao et al., "Building Personal Maps from GPS Data", Annals of the New York Academy of Sciences, vol. 1093, Dec. 2006, pp. 249-265.
Mountain View Restaurants, Dentists, Bars, Beauty Salons, Doctors, http://www.yelp.com/mountain-view-ca, retrieved on Aug. 10, 2011, 2 pages.
Schafer et al., "Collaborative Filtering Recommender Systems", Lecture Notes in Computer Science, vol. 4321, 2007 pp. 291-324.
Takeuchi et al., "CityVoyager: An Outdoor Recommendation System Based on User Location History", Lecture Notes in Computer Science, vol. 4159, 2006, pp. 625-636.
Wang et al., "A User-Centric Approach for Social Data Integration and Recommendation", Third International Conference on Human-Centric Computing, Cebu, Philippines, Aug. 11-13, 2010, 8 pages.
Yahoo! Answers, http://answers.yahoo.com/, retrieved on Aug. 10, 2011, 5 pages.
Ye et al., "Mining Individual Life Pattern Based on Location History", Tenth International Conference on Mobile Data Management: Systems, Services and Middleware, Taipei, Taiwan, May 18-20, 2009, 10 pages.
Yelp, Inc., Wikipedia, http://en.wikipedia.org/wiki/Yelk,_Inc, retrieved on Aug. 10, 2011, 1 page.
Yingchen et al., "An Ontology-Based Approach for Mobile Personalized Recommendation", 2009 IITA International Conference on Service Science, Management and Engineering, Zhangjiajie, China, Jul. 11-12, 2009, pp. 336-339.
Zheng et al., "Collaborative Location and Activity Recommendation with GPS History Data", World Wide Web 2010, Raleigh, North Carolina, Apr. 26-30, 2010, pp. 1029-1038.
Zheng et al., "GeoLife: A Collaborative Social Networking Service Among User, Location and Trajectory", Bulletin of the IEEE Computer Society Technical Committee on Data Engineering, Jun. 2010, 8 pages.
Herring et al., "Determining Geo-Locations of Users from User Activities", U.S. Appl. No. 13/458,895, filed Apr. 27, 2012.
Maennel, "Determining Geo-Locations of Users from User Activities", U.S. Appl. No. 13/830,182, filed Mar. 14, 2013.
Maennel, "Location Direction from Queries Using Evidence for Location Alternatives", U.S. Appl. No. 13/831,549, filed Mar. 14, 2013.
PCT International Search Report for corresponding PCT Application No. PCT/US2016/023665, mailed on Jun. 29, 2016—10 pages.

* cited by examiner

DETERMINING SEMANTIC PLACE NAMES FROM LOCATION REPORTS

FIELD

The present disclosure relates generally to determining device location, and more particularly to systems and methods for determining semantic place names and related data based at least in part on one or more location reports.

BACKGROUND

Many different techniques exist for attempting to determine a location associated with a device. For example, location based on GPS, IP address, cell triangulation, proximity to Wi-Fi access points, proximity to beacon devices, or other techniques can be used to identify a location of a device. Given the desire to respect user privacy, device location may only be determined if a user provides consent. Any authorized sharing of user location data can be secure and private, and can be shared only if additional consent is provided. For many purposes, user identity associated with the location of a device can be configured in an anonymous manner such that user assistance and information related to a specific location can be provided without a need for user-specific information.

The locations reported by one or more devices can be raw location data. For example, the reported location can be a geocode that identifies a latitude and longitude. Therefore, such raw location data can fail to identify a name of the particular entity (e.g. the name of the restaurant, park, or other point of interest) that the user was visiting at the time. Systems exist for determining the semantic location of the user device. The semantic location can include the identity or name of the particular entity (e.g. the name of the particular restaurant, store, park, or other point of interest) the user carrying the device was located at a particular time. To determine semantic location, raw location data (e.g. geographic coordinates) can be compared to a database of information associated with known places (e.g. local businesses) to infer the most likely semantic location of the user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a semantic place name of a location visited by a user device. The method includes receiving, by one or more computing devices, at least one location report associated with a user device. The method further includes accessing, by the one or more computing devices, data associated with one or more point clouds. Each point cloud is associated with a candidate semantic place location. Each point cloud is generated from previously obtained location reports aggregated for a plurality of devices. Each point cloud has a plurality of data points. Each data point corresponds to a high quality visit by one of the plurality of devices to the candidate semantic place location associated with the point cloud. The method further includes identifying, by the one or more computing devices, a semantic place name visited by the user device based at least in part on the location report and the one or more point clouds. Each high quality visit is identified as a visit by one of the plurality of devices that is determined to be associated with the candidate semantic place location with greater likelihood relative to a plurality of other candidate semantic place locations.

Other example aspects of the present disclosure are directed to systems, apparatus, tangible, non-transitory computer-readable media, user interfaces, memory devices, and electronic devices for determining device location (e.g. semantic place name) and/or analyzing location reports.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
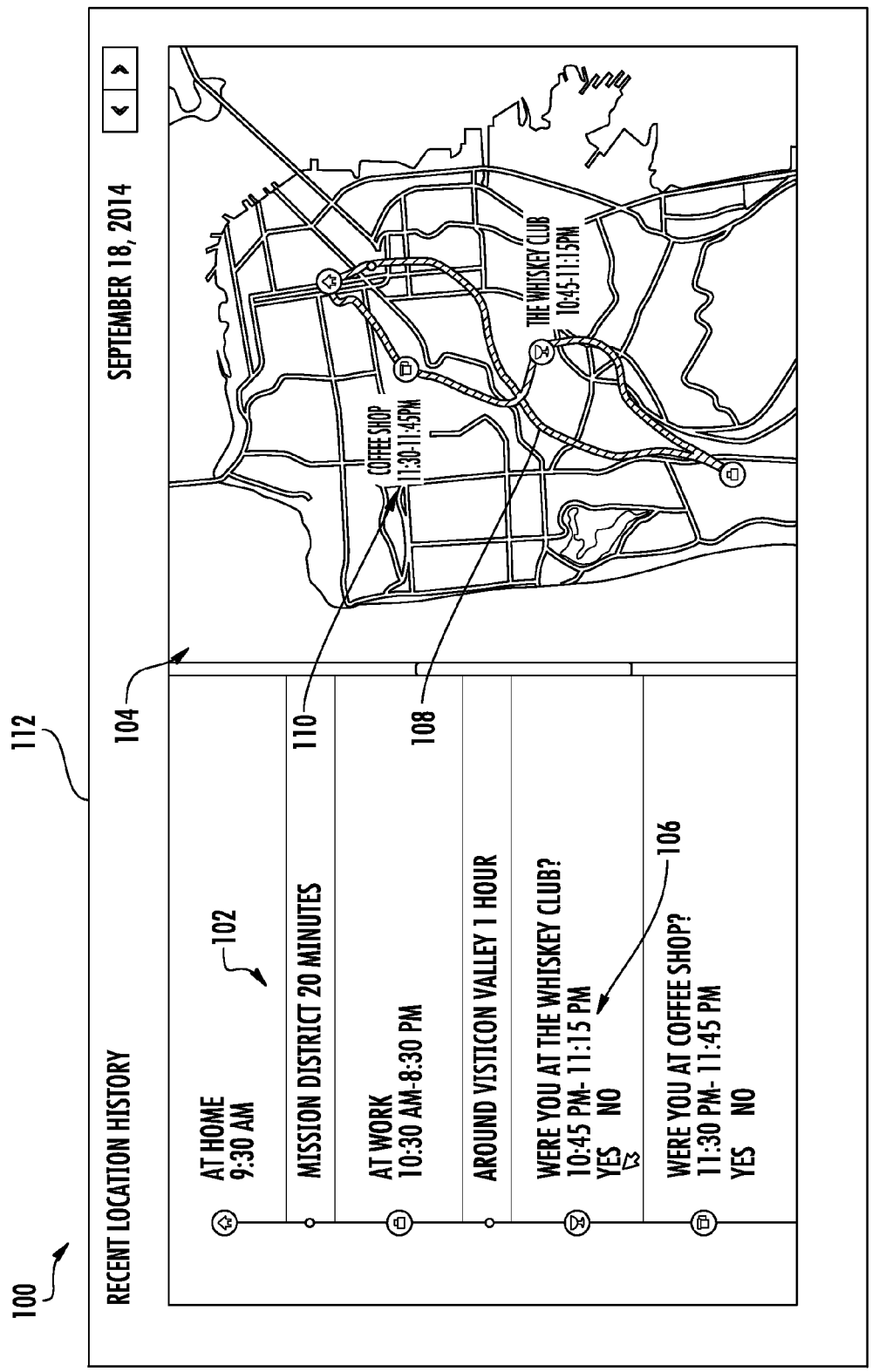
FIG. 1 depicts an example user interface providing semantic place name information according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining semantic place names for a user's visits from raw location data (e.g. latitude, longitude coordinates) associated with location reports corresponding to the user's visits. As used herein, a semantic place name refers to the name of the entity where a device is located. For instance, a semantic place name can include the name of a restaurant, park, store, or other point of interest.

Various techniques can be used to determine a semantic place name associated with a location report. For instance a semantic place name can be determined by obtaining a location report and inferring the semantic place location of the user from data associated with the location report. In example implementations, the semantic place location can be inferred using an inference module by comparing the raw location data associated with the location report with data corresponding to the geographic location of semantic place locations (e.g. building locations). For example, the semantic place name can be determined based at least in part on a distance (e.g. a distance signal) from a location (e.g. latitude, longitude, etc.) associated with the location report to the location of the various semantic place locations located nearby. Other signals can also be used to determine semantic place location, such as Wi-Fi signal strengths, search history, location history, social signals, etc.

The efficacy of these approaches can be dependent on the quality of the location reports and the accuracy of data available with respect to semantic place locations (e.g. building geometry). In certain instances, the data associated with the location report can be inaccurate. For instance, location reports from devices located inside buildings can be imprecise for a variety of technical reasons (e.g. lack of GPS signals). This can make it challenging to infer the true position of the device, much less the semantic place name of the location being visited by the user. Moreover, certain data (e.g. building geometry data) associated with semantic location can be sparse or unavailable. As a result, a distance signal used to determine semantic place name can be a measure of a distance between imprecise locations: that of the user device and that of a representative point for a building. Moreover, not all user devices can provide the same number of signals for determining semantic place name.

According to example aspects of the present disclosures, techniques are provided for enhancing the accuracy of semantic place names determined for location reports received from user devices. More particularly, previously obtained location reports from a plurality of devices are analyzed to identify high quality visits to candidate semantic place locations. A high quality visit can be a visit where the likelihood of being located at a particular candidate semantic place location is greater than a likelihood of being located at each of a plurality of other candidate semantic place locations as obtained and determined, for instance, by an inference module. A high quality visit can occur, for instance, when a visit to a candidate semantic place location is strongly suggested by one or more signals indicative of semantic place location, such as but not limited to, distance signals, past search history, past visits, Wi-Fi signal strengths, social signals (e.g. check-ins), and other signals.

High quality visits for a candidate semantic place location from a plurality of location reports can be aggregated and used to generate a point cloud for the semantic place location. The point cloud can include a plurality of data points. Each data point can correspond to a high quality visit. Each data point can be associated with data indicative of a geographic location and data indicative of the semantic place location corresponding to the high quality visit. According to example aspects of the present disclosure, the point cloud can be accessed and used to support determinations of semantic place name for a location report.

In one example implementation, one or more location reports for a user device can be matched to a point cloud. If the location report(s) aligns with, corresponds to, tracks, and/or otherwise matches a pattern of data points in a point cloud, this can be used to support an inference that the location report is associated with a semantic place name corresponding to the candidate semantic location associated with the point cloud.

In another example implementation, a pattern can be extracted from one or more point clouds. The pattern can include a plurality of geographic cells. Each cell can be associated with a probability value determined based on the presence of data points associated with the one or more point clouds in the geographic cells. The probability value can be indicative of the probability of a location report being located within the cell being associated with a candidate semantic place location. A location report received from a user device can be matched to the geographic cell and the probability value associated with the cell can be used to determine a semantic place name for the location report.

As an example, a location report can be received from a user device. The location report may not be associated with signals strongly indicative of semantic place location. For example, distance signals associated with the location report may indicate that the location report corresponds to a location having a distance to a first candidate semantic place location (e.g. "Bistro 27") that is relatively equal or close to a distance to a second candidate semantic place location (e.g. "Mona's Kitchen"). To obtain a semantic place name for the location report, point clouds associated with the Bistro 27 and Mona's Kitchen can be accessed. If the location report is matched with the point cloud associated with Bistro 27, it can support a determination that the semantic place name for the location report is Bistro 27.

In some embodiments, in order to obtain the benefits of the techniques described herein, a user may be required to allow the collection and analysis of location information associated with a user or device. For example, in some embodiments, users may be provided with an opportunity to control whether programs or features collect such information. If the user does not allow collection and use of such signals, then the user may not receive the benefits of the techniques described herein (e.g. may not be provided information associated with semantic place name). The user can also be provided with tools to revoke or modify consent. In addition, certain information or data can be treated in one or more ways before it is stored or used, so that personally identifiable information is removed. For example, embodiments of the disclosed technology can be configured to enhance user privacy by removing identifiers for mobile devices or users. In some instances, device and/or user identifiers can be replaced with a lossy device indicator which might conflate a large number of devices or users into a single identifier.

With reference now to the FIGS., example embodiments of the present disclosure will be discussed in further detail. FIG. 1 depicts an example user interface 100 displaying semantic place names (e.g. "home", "work", "Whisky Club," "Coffee Shop") determined from location reports received from a user device. The user interface 100 can be provided for display on a display device 112, such as the display screen of a smartphone, tablet, wearable computing device, laptop, desktop, display with one or more processors, or other suitable computing device. The example semantic place names in FIG. 1 are displayed as a part of a location history determined for the user device. Those of ordinary skill in the art, using the disclosures provided herein, will understand that the semantic place names can be provided in other suitable contexts, such as a display of information associated with a current location of a user device.

As shown, the user interface 100 can include a timeline 102 and a map 104. Timeline 102 can provide a chronological listing of semantic place locations visited by the user. For example, timeline 102 indicates that, according to the user's location history, on Sep. 18, 2014 the user was at the user's home at about 9:30 AM; spent about 20 minutes in the Mission District area; was at the user's workplace from about 10:30 AM to 8:30 PM; spent about 1 hour in the Visticon Valley area; was at The Whiskey Club bar from about 10:45 PM to 11:15 PM; was at Coffee Shop from about 11:30 PM to 11:45 PM; and then returned home at midnight. As will be discussed in more detail below, the semantic place locations of the user device can be inferred from location reports received from the user device according to example aspects of the present disclosure.

User interface 100 can provide one or more opportunities for the user to verify or validate semantic place location information. For example, portion 106 of timeline 102 offers an opportunity for the user to confirm that she did in fact visit The Whiskey Club. Furthermore, portion 106 can also provide an opportunity for the user to confirm that she visited The Whiskey Club from 10:45 PM to 11:15 PM. In further embodiments, opportunities can be provided for the user to confirm the presence of one or more additional users that visited the location entity with the user. The user interface 100 can provide various opportunities for the user to edit, control, share, personalize, or otherwise modify, explore, or interact with her location history.

Map 104 can provide a graphical depiction of the user's location as it changed over the course of the selected time period. For example, one or more routes (e.g. route 108) taken by the user can be overlaid upon a map showing the corresponding geographical area traversed by the user. In addition, one or more icons (e.g. icon 110) indicating particular location entities visited by the user can be overlaid upon the map. Similar to timeline 102, in some implementations, map 104 can be interactive and editable. Furthermore, in some embodiments, route 108 can be an approximated route between location entities identified as having been visited by the user.

Figure 2:
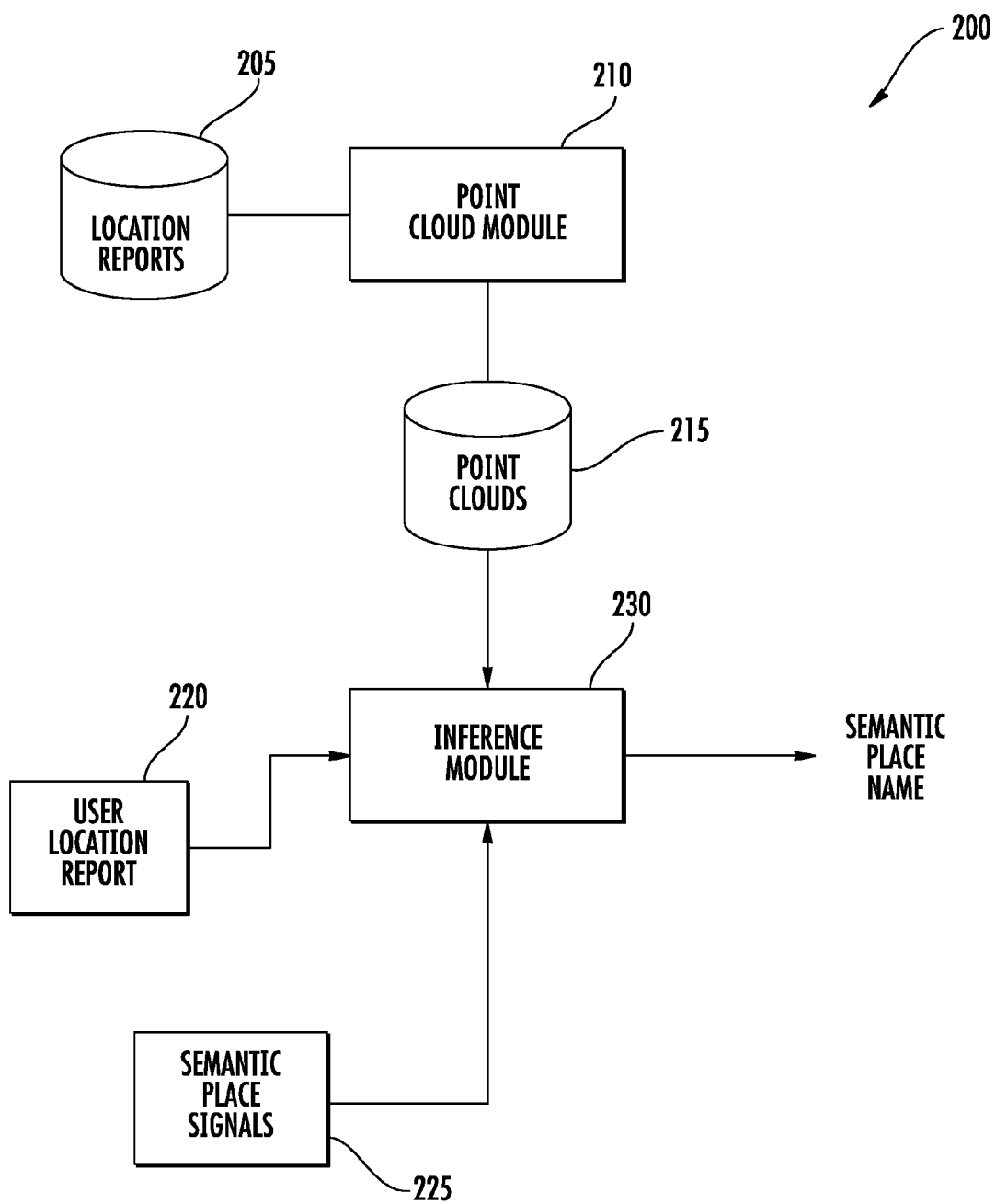
FIG. 2 depicts an example system for determining semantic place names according to example embodiments of the present disclosure.

FIG. 2 depicts an overview of an example system 200 for determining semantic place names for location reports according to example embodiments of the present disclosure. The system 200 includes a point cloud module 210 and an inference module 230. The point cloud module 210 and the inference module 230 can be implemented by one or more computing devices, such as one or more of the computing devices depicted in FIG. 8.

The point cloud module 210 can be configured to access a plurality of location reports 205 previously obtained or reported from a plurality of different devices. The point cloud module 210 can be configured to generate point clouds 215 for each of a plurality of candidate semantic locations based on high quality visits determined for each candidate semantic place location from the plurality of location reports 205. The inference module 230 can receive one or more user location reports 220 from a user device. The inference module 230 can then infer a semantic place name associated with a visit corresponding to the user location reports 220 based on the point clouds 215 generated by the point cloud module 210 as well as other signals 225 indicative of semantic place location.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, ROM, flash memory, hard disk or optical or magnetic media. When software is used, any suitable programming language or platform can be used to implement the module.

Point cloud module 210 can be configured to access a plurality of previously obtained location reports 205 received from a plurality of different user devices. The point cloud module 210 can analyze the plurality of previously obtained location reports 205 to determine if any of the location reports 205 correspond to a high quality visit with a semantic place location. A high quality visit corresponds to a location report that is determined to be associated with a candidate semantic place location with greater likelihood relative to a plurality of other candidate semantic place locations. For instance, a high quality visit can correspond to a location report having a confidence score for a candidate semantic place location greater than a threshold confidence relative to confidence scores for other candidate semantic place locations.

If a location report does correspond to a high quality visit with a candidate semantic place location, a data point corresponding to the location report can be generated for a point cloud associated with the candidate semantic place location. The data point can include data indicative of geographic location (e.g. latitude and longitude) of the location report as well as other information, such as a time stamp indicative of the time the user device was located at the particular location.

According to example aspects of the present disclosure, the inference module 230 can infer or determine semantic place location from user location report(s) 220 based at least in part on the point clouds 215 generated by the point cloud module 210. More particularly, the inference module 230 can receive signals indicative of location report(s) 220 from, for instance, a user device. The location report(s) 220 can provide historical or current information about user device location. The location report(s) 220 can provide position information associated with the user device (e.g. latitude, longitude) and a time stamp associated with the location report. The location report can be determined, for instance, using a positioning system associated with the user device. The positioning system can generate the location report based on, for instance, GPS signals, IP address, cell triangulation, proximity to Wi-Fi access points, proximity to beacon devices, etc.

The inference module 230 can be configured to process the location report(s) 220 to determine a semantic place name or label for each of the location report(s) 220. For instance, in one embodiment, the location report(s) 220 can be clustered into segments based on various factors, such as distance. A plurality of candidate semantic locations can be identified for each segment. The plurality of candidate semantic locations can be identified, for instance, based on mapping data identifying one or more candidate semantic place locations that are proximate to (e.g. within a threshold distance of) the location of the segments.

The inference module 230 can then determine confidence scores for each of the candidate semantic place locations. The confidence scores can be indicative of the probability that a location report is associated with a particular candidate semantic place location. The confidence scores can be determined based on a variety of factors, such as distance from a position associated with the location report(s) to a point associated with the candidate semantic place location. The semantic place name can be determined based at least in part on the confidence scores. For instance, the candidate semantic location associated with the highest confidence score can be selected as the candidate semantic place name for the location report(s).

Other signals indicative of semantic place location 225 can also be processed by the inference module to determine confidence scores for each of the candidate semantic place locations. These additional signals can include one or more of search history, location history, social signals, wireless network scans, etc. For instance, if a user previously conducted a search via a search engine for information concerning one of the candidate semantic place locations, this can be used to increase the confidence score for the candidate semantic place location. As another example, a social signal (e.g. a user check-in with a candidate semantic location) can be used by the inference module 230 to infer that a location report is more likely associated with the candidate semantic location where the check-in occurred.

According to aspects of the present disclosure, the inference module 230 can access the point clouds 215 generated by the point cloud module 210 to support or determine an inference that one or more location report(s) 220 are associated with a candidate semantic place location. For instance, the location report(s) 220 can be matched with one or more point clouds. The semantic place name can be determined by the inference module 230 based on a closeness of the match with a particular point cloud associated with a candidate semantic place location. Alternatively and/or in addition, the point clouds 215 can be aggregated to determine a pattern. The pattern can provide data indicative of a probability of being associated with a particular candidate semantic place location depending on a particular geographic location associated with the location report. The semantic place name can be determined by the inference module 230 based at least in part on the determined probability.

The semantic place names determined by the inference module 230 can be used for a variety of purposes. For instance, the semantic place names can be provided for display on a user interface, such as part of a mapping application or service implemented on the user device. The semantic place names can also be stored in a memory as part of a location history determined for a user device. In some implementations, the semantic place names can be accessed to enhance social media, mapping applications, or other suitable applications. In some implementations, the semantic place names can be accessed using an application programming interface (API).

Figure 3:
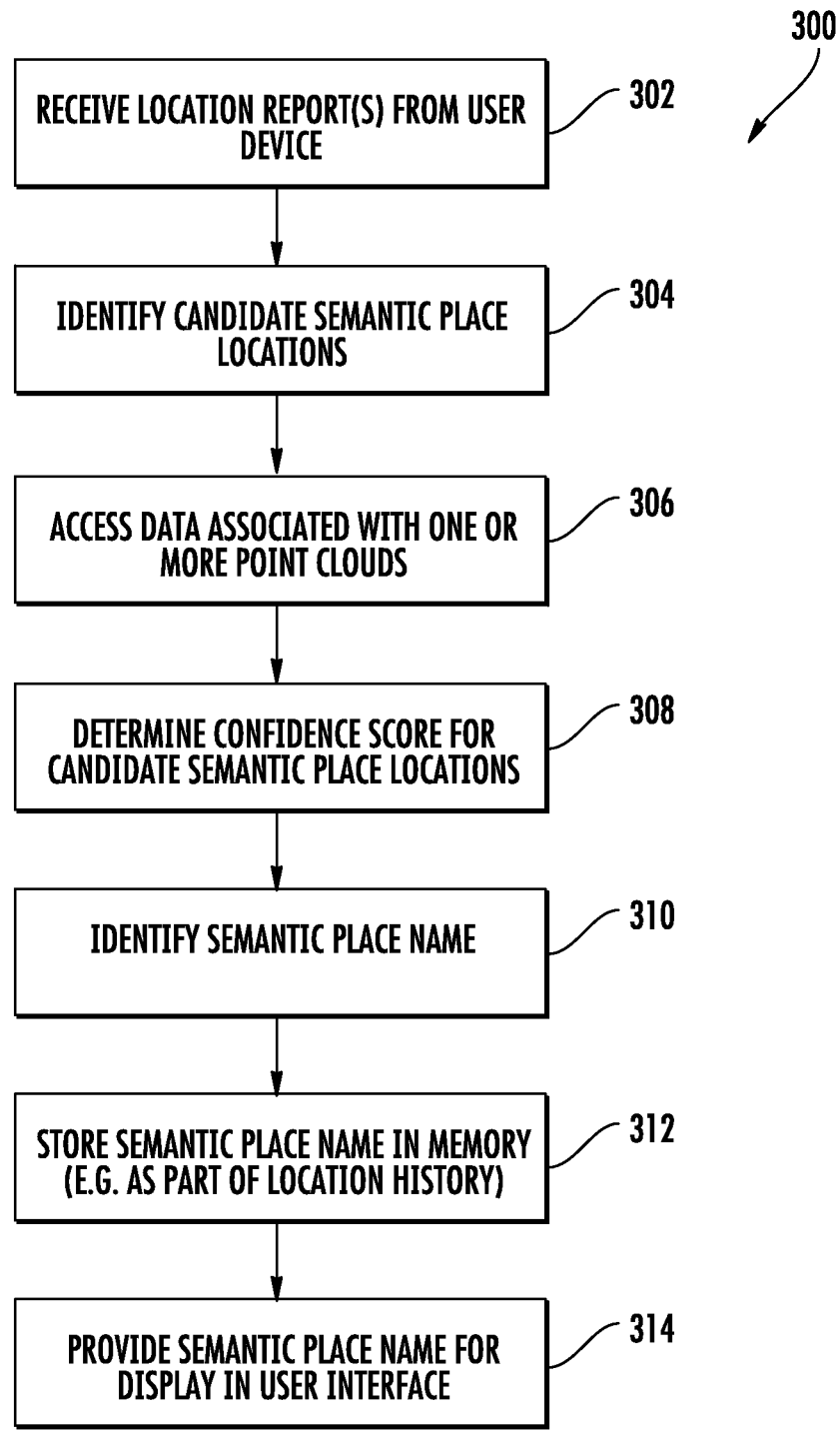
FIG. 3 depicts a flow diagram of an example method for determining semantic place names according to example embodiments of the present disclosure.

FIG. 3 depicts a flow diagram of an example method (300) for determining semantic place names according to example embodiments of the present disclosure. Method (300 can be implemented by one or more computing devices, such as one or more of the computing devices depicted in FIG. 8. In particular implementations, the method (300) can be implemented by the inference module 230 depicted in FIG. 2. FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), the method includes receiving one or more location reports for a user device. The location reports can include data indicative of raw location (e.g. latitude, longitude coordinates) as well as other information, such as a time stamp associated with the location report. The location reports can be generated by a positioning system associated with a user device.

At (304), the method includes identifying a plurality of candidate semantic place locations for the location reports. The candidate semantic place locations can be determined based on a variety of factors. For instance, the candidate semantic place locations can be determined by clustering location reports into segments and identifying from mapping data candidate semantic place locations that are proximate to the segments.

At (306), data associated with one or more point clouds can be accessed. More particularly, data associated with a point cloud for each of the plurality of candidate semantic place locations can be accessed. Each point cloud can be generated, for instance, by identifying high quality visits corresponding to the plurality of candidate semantic locations from a plurality of previously obtained locations reports. Each point cloud can include a plurality of data points. Each data point can correspond to a high quality visit to the candidate semantic place location associated with the point cloud.

Figure 4:
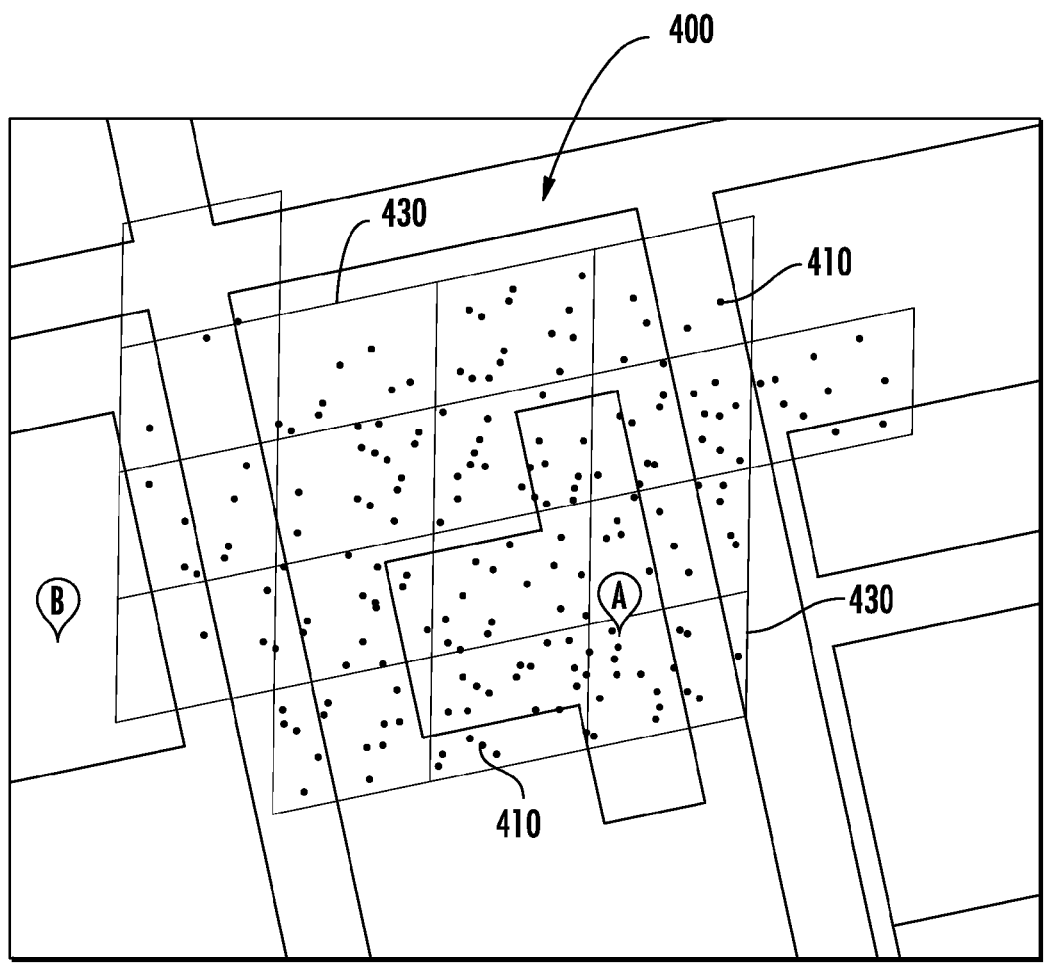
FIG. 4 depicts an example representation of a point cloud for a first candidate semantic place location determined according to example embodiments of the present disclosure.

For example, FIG. 4 depicts a representation of one example point cloud 400 determined for a candidate semantic place location according to example embodiments of the present disclosure. The point cloud 400 is associated with candidate semantic place location A. As shown, the point cloud 400 can include a plurality of data points 410. Each data point 410 corresponds to a high quality visit for candidate semantic place location A determined from previous obtained location reports.

Referring back to FIG. 3 at (308), a confidence score can be determined for each of the plurality of candidate semantic place locations based at least in part on the one or more point clouds The confidence score is indicative of the likelihood (e.g. probability) of the location report being associated with a particular candidate semantic place location. The confidence score can be determined based on various factors. One factor can be the distance between a geographic point associated with the location report and one or more points associated with the candidate semantic place location. Other suitable factors can be based on signals indicative of search history, location history, social signals, and other information.

The confidence score can also be based on data extracted or identified from the one or more point clouds associated with the candidate semantic place locations. For instance, in one implementation, the confidence score can be based on a closeness of a match between one or more location reports received from the user device and one or more data points in a point cloud. For instance, the more matches that occur between location reports and data points in the point cloud, the higher the confidence score for the candidate semantic place location. A match can occur between a location report and a data point in a point cloud when the location corresponding to the location report is proximate to (e.g. within a threshold distance) a location associated with a data point in the point cloud.

Figure 5:
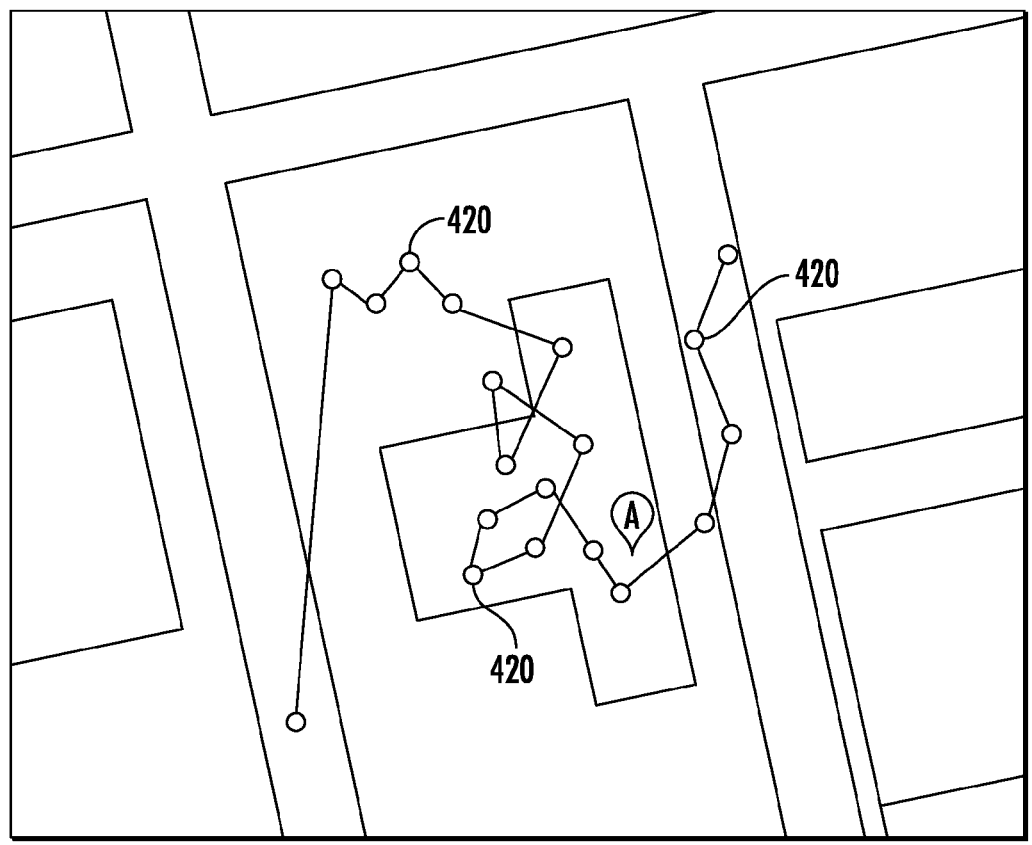
FIG. 5 depicts a plurality of example location reports used to determine a semantic place name according to example embodiments of the present disclosure.

As an example, FIG. 5 depicts a plurality of location reports 420 obtained for a user device. Certain of the location reports 420 can be determined to match one or more data points 410 associated with the point cloud 400 generated for candidate semantic place location A shown in FIG. 4. The number of location reports 420 determined to match the data points 410 can be used to determine a confidence score that the user device was located at candidate semantic location A.

In addition and/or in the alternative, the plurality of point clouds can be analyzed to determine one or more patterns. The pattern can include a plurality of geographic cells. The geographic cells can be obtained by subdividing a geographic area into distinct regions. Those of ordinary skill in the art, using the disclosures provided herein, will understand that the pattern can include any number of geographic cells of any size.

Each geographic cell can provide a probability value of being associated with each of a plurality of candidate semantic place locations. The probability value for a candidate semantic place location can be indicative of the likelihood of a location report determined to be located within the geographic cell to be associated with a candidate semantic place location. The probability value can be determined, for instance, based on the number of data points in the geographic cell in the point cloud for the candidate semantic place location.

For example, FIG. 4 subdivides a geographic area into a plurality of geographic cells 430. Each cell 430 can provide a probability value of being associated with candidate semantic place location A. The probability value for a geographic cell 430 of being located at candidate semantic place location A can be determined based on the number of data points 410 located within the geographic cell 430 for candidate semantic place location A.

Figure 6:
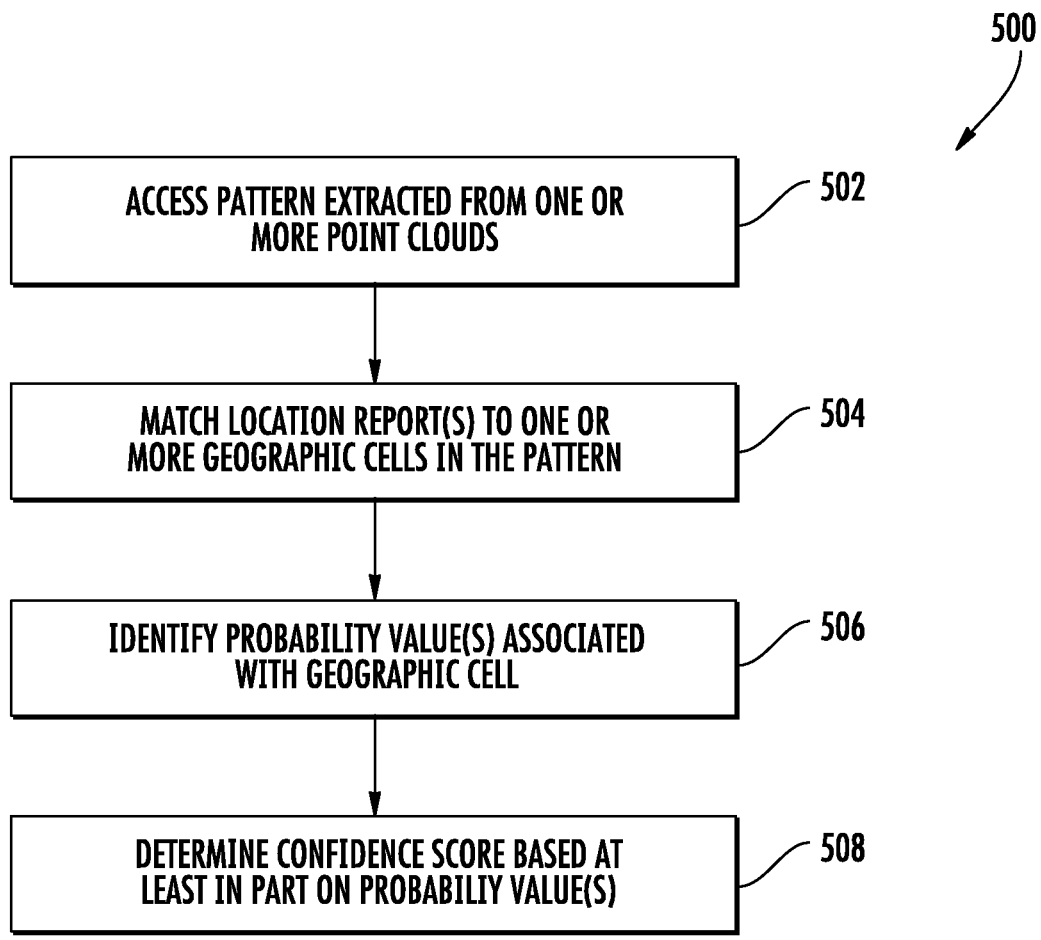
FIG. 6 depicts a flow diagram of an example method for determining a semantic place name based at least in part on one or more location reports and a point cloud according to example embodiments of the present disclosure.

FIG. 6 depicts a flow diagram of an example method (500) for determining a confidence score for a candidate semantic place location based at least in part on a pattern extracted from one or more point clouds according to example embodiments of the present disclosure. At (502), the method can include accessing the pattern extracted from the one or more point clouds. As discussed above, the pattern can include a plurality of geographic cells. Each geographic cell can provide a probability value of being located at each of one or more candidate semantic place names. The probability value can be determined based at least one the one or more point clouds. For instance, the probability value provided by a geographic cell for a candidate semantic place location can be determined based on a number of data points of the point cloud for the candidate semantic place location that are located within the geographic cell.

At (504), the method includes matching a location report to a geographic cell. For instance, a location report received from a user device can be matched with the geographic cell encompassing the location associated with the location report. At (506), the probability value for each candidate semantic place name associated with the geographic cell can be identified. The confidence score for each candidate semantic place name can then be determined on the probability value for the candidate semantic place name (508). For example, higher probability values for candidate semantic place names can result in increasing the confidence scores for the candidate semantic place names.

Referring back to FIG. 3 at (310) a semantic place name is determined for the location reports. The semantic place name can be determined based at least in part on the confidence scores for the plurality of candidate semantic place locations. For instance, the semantic place name can be determined as the name of the candidate semantic place location associated with the highest confidence score.

At (312), the semantic place name for the location report(s) can be stored in one or more memory devices. For instance, the semantic place name can be stored as part of a location history for a user. The semantic place name can then be used for a variety of purposes. For instance, at (314) the semantic place name can be provided for display in a user interface, such as the user interface 100 of FIG. 1.

Figure 7:
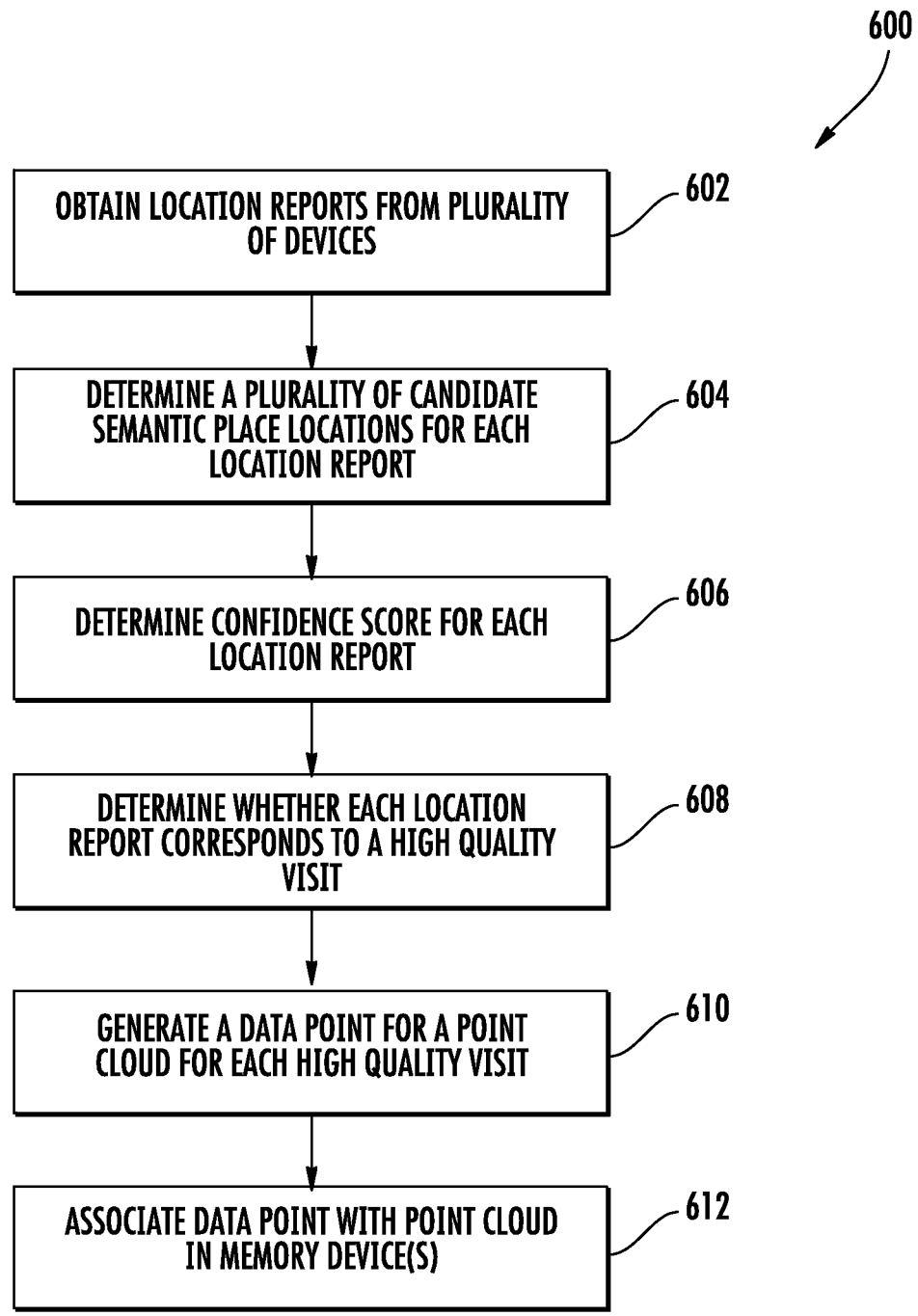
FIG. 7 depicts a flow diagram of an example method for generating a point cloud for a candidate semantic location according to example embodiments of the present disclosure.

FIG. 7 depicts a flow diagram of an example method (600) for generating the one or more point clouds used in determining semantic place name according to example aspects of the present disclosure. The method of FIG. 7 can be implemented by one or more computing devices, such as one or more of the computing devices depicted in FIG. 8. In particular implementations, the method (600) can be implemented by the point cloud module 210 of FIG. 2.

At (602) of FIG. 7, the method includes obtaining location reports from a plurality of devices. For instance, location reports obtained over a period of time from a plurality of devices can be stored in a memory device, such as a memory device at a server. The location reports can be accessed from the memory. At (604), a plurality of candidate semantic place locations for each location report can be identified.

Confidence scores for each candidate semantic place location can then be determined at (606). The confidence score for each candidate semantic place location can be indicative of the likelihood of a location report corresponding to or being located at the candidate semantic place location. As discussed above, the confidence scores for each candidate semantic place location can be determined based on a various signals, such as distance from the location report to a point or building outline associated with the candidate semantic location. The confidence scores can be determined based on other signals indicative of semantic place location, such as search history, wireless network scans, social signals, etc.

Once the confidence scores have been determined have been determined for the candidate semantic place names, it can be determined whether the location report corresponds to a high quality visit (608). For instance, the location report can correspond to a high quality visit when the confidence score for a candidate semantic place name is significantly greater than a confidence score for the other candidate semantic place names for the location report.

In particularly implementations, the location report can be determined to correspond to a high quality visit with a candidate semantic place location when a confidence score for the candidate semantic place location is greater than a threshold confidence relative to the plurality of other candidate semantic place locations for the location report. In specific implementations, a location report can correspond to a high quality visit for a candidate semantic place location when the confidence score for the candidate semantic place location is greater than a threshold confidence of about 25% relative to the confidence scores for the other candidate semantic place locations. As used herein, the term "about" when used in conjunction with numerical values is intended to refer to within 20% of the stated numerical value.

As an example, four candidate semantic place locations can be identified for a location report: Location A, Location B, Location C, and Location D. A confidence score can be determined for each of Location A, Location B, Location C, and Location D based on signals indicative of semantic place location. The confidence score for Location A can be 87.483%. The confidence score for Location B can be 9.304%. The confidence score for Location C can be 0.282%. The confidence score for Location D can be 0.249%. In this example, the confidence score for Location A is greater than a threshold confidence of 25% relative to the confidence score for Location B, Location C, and Location D. Accordingly, the location report can be identified as a high quality visit with Location A.

Referring to FIG. 7 at (610), a data point is generated for a point cloud associated with a candidate semantic place location for each high quality visit determined for the candidate semantic place location. The data point can then be associated with the point cloud for the candidate semantic place location in one or more memory devices (612). The point cloud can be accessed for determination of semantic place name according to example aspects of the present disclosure.

Figure 8:
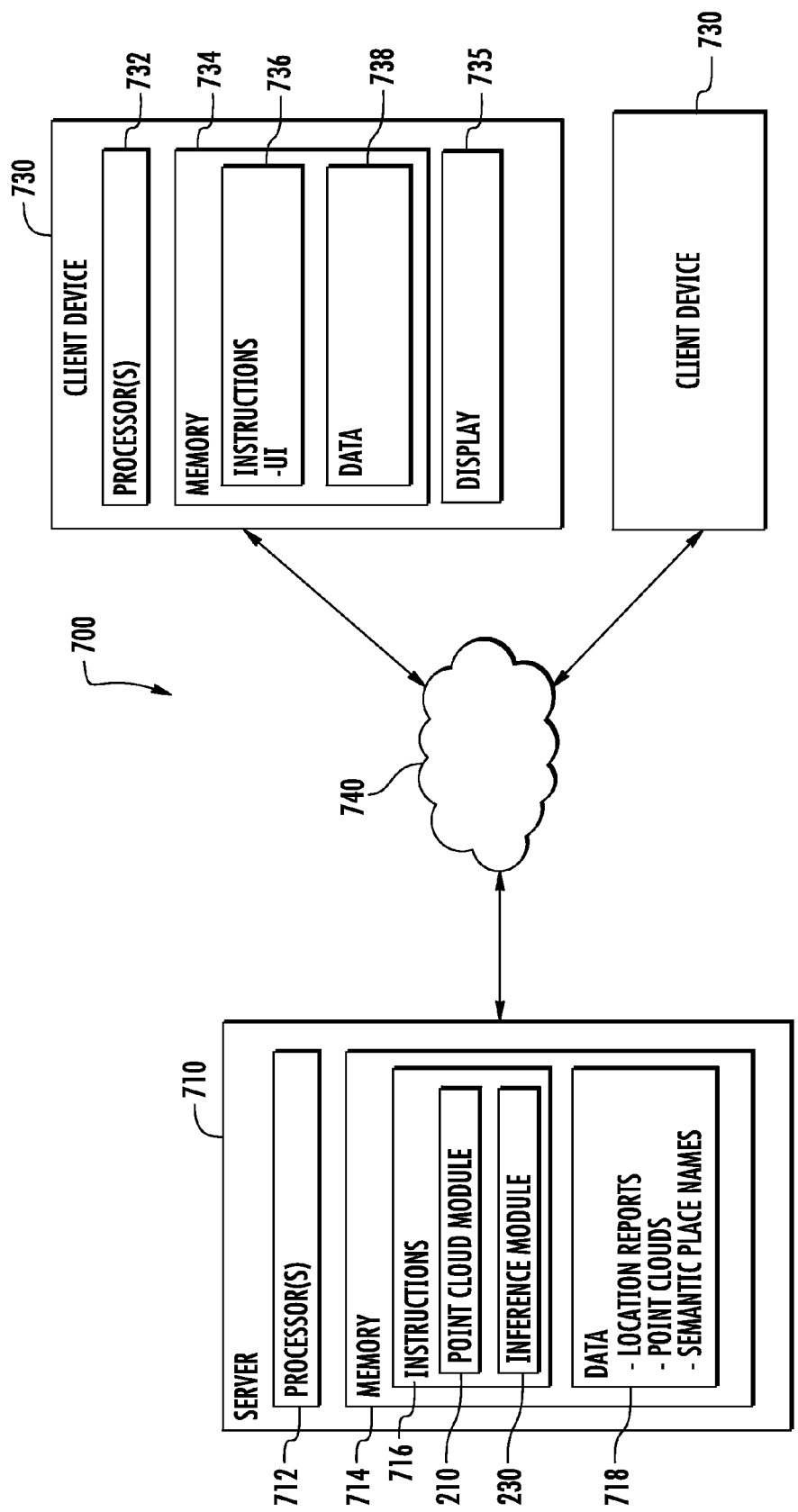
FIG. 8 depicts an example computing environment for determining a semantic place name according to example embodiments of the present disclosure.

FIG. 8 depicts an example computing system 700 that can be used to implement the methods and systems according to example aspects of the present disclosure. The system 700 can be implemented using a client-server architecture that includes a server 710 that communicates with one or more client devices 730 over a network 740. The system 700 can be implemented using other suitable architectures, such as a single computing device.

The system 700 includes a server 710, such as a web server. The server 710 can host a geographic information system, such as a geographic information system associated with a mapping service. The server 710 can be implemented using any suitable computing device(s). The server 710 can have one or more processors 712 and one or more memory devices 714. The server 710 can also include a network interface used to communicate with one or more client devices 730 over the network 740. The network interface can include any suitable components for interfacing with one more networks, including for example, transmitters, receivers, ports, controllers, antennas, or other suitable components.

The one or more processors 712 can include any suitable processing device, such as a microprocessor, microcontroller, integrated circuit, logic device, or other suitable processing device. The one or more memory devices 714 can include one or more computer-readable media, including, but not limited to, non-transitory computer-readable media, RAM, ROM, hard drives, flash drives, or other memory devices. The one or more memory devices 714 can store information accessible by the one or more processors 712, including computer-readable instructions 716 that can be executed by the one or more processors 712. The instructions 716 can be any set of instructions that when executed by the one or more processors 712, cause the one or more processors 712 to perform operations. For instance, the instructions 716 can be executed by the one or more processors 712 to implement one or more modules, such as the point cloud module 210 and an inference module 230 described with reference to FIG. 2.

As shown in FIG. 8, the one or more memory devices 714 can also store data 718 that can be retrieved, manipulated, created, or stored by the one or more processors 712. The data 718 can include, for instance, location reports, mapping data, point clouds generated according to example aspects of the present disclosure, semantic place names determined according to example aspects of the present disclosure, and other data. The data 718 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more client devices 730 over the network 740. Although two client devices 730 are illustrated in FIG. 8, any number of client devices 730 can be connected to the server 710 over the network 740. Each of the client devices 730 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 710, a client device 730 can include one or more processor(s) 732 and a memory 734. The one or more processor(s) 732 can include one or more central processing units (CPUs), graphics processing units (GPUs) dedicated to efficiently rendering images or performing other specialized calculations, and/or other processing devices. The memory 734 can include one or more computer-readable media and can store information accessible by the one or more processors 732, including instructions 736 that can be executed by the one or more processors 732 and data 738. For instance, the memory 734 can store instructions 736 for implementing a user interface module for displaying semantic place names determined according to example aspects of the present disclosure.

The client device 730 of FIG. 8 can include various input/output devices for providing and receiving information from a user, such as a touch screen, touch pad, data entry keys, speakers, and/or a microphone suitable for voice recognition. For instance, the client device 730 can have a display device 5735 for presenting a user interface displaying semantic place names according to example aspects of the present disclosure.

The client device 730 can also include a network interface used to communicate with one or more remote computing devices (e.g. server 710) over the network 740. The network interface can include any suitable components for interfacing with one more networks, including for example, transmitters, receivers, ports, controllers, antennas, or other suitable components.

The network 740 can be any type of communications network, such as a local area network (e.g. intranet), wide area network (e.g. Internet), cellular network, or some combination thereof. The network 740 can also include a direct connection between a client device 730 and the server 710. In general, communication between the server 710 and a client device 730 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a semantic place name visited by a user device, comprising:
   receiving, by one or more processors, at least one location report associated with a user device;
   accessing, by the one or more processors, data associated with one or more point clouds, each point cloud associated with a candidate semantic place location, each point cloud generated from previously obtained location reports aggregated for a plurality of different devices, each point cloud comprising a plurality of data points, each of the plurality of data points corresponding to a high quality visit by one of the plurality of different devices to the candidate semantic place location associated with the point cloud; and
   identifying, by the one or more processors, the semantic place name visited by the user device based at least in part on a match between the location report and the one or more point clouds;
   wherein each high quality visit is identified, by the one or more processors, as a visit by one of the plurality of different devices that is determined to be associated with the candidate semantic place location with greater than a threshold confidence score relative to a plurality of other candidate semantic place locations.

2. The computer-implemented method of claim 1, further comprising:
   providing for display, by the one or more processors, the semantic place name in a user interface presented on a display device.

3. The computer-implemented method of claim 1, further comprising:
   storing, by the one or more processors, the semantic place name as part of a location history for the user device.

4. The method of claim 1, wherein identifying, by the one or more processors, the semantic place name based at least in part on the location report associated with the user device and the one or more point clouds comprises:
   accessing, by the one or more processors, a pattern extracted from the one or more point clouds, the pattern comprising a plurality geographic cells, each geographic cell providing a probability value of being located at each of one or more candidate semantic place names, the probability value being determined based at least in part on the one or more point clouds;
   matching, by the one or more processors, the location report to one of the plurality of geographic cells; and
   determining, by the one or more processors, the semantic place name based at least in part on the probability value associated with the geographic cell matched to the location report.

5. The method of claim 1, wherein each of the plurality of point clouds is generated based at least in part by performing operations, the operations comprising:
   receiving, by the one or more processors, a location report from one of the plurality of devices;
   determining, by the one or more processors, that the location report corresponds to a high quality visit;
   identifying, by the one or more processors, the candidate semantic place location corresponding to the high quality visit; and
   generating a data point for the point cloud associated with the candidate semantic place location based at least in part on the location report.

6. The method of claim 5, wherein the operation of determining, by the one or more processors, that the location report corresponds to a high quality visit comprises:
   identifying, by the one or more processors, a plurality of candidate semantic place locations for the location report;
   determining, by the one or more processors, a confidence score for each of the plurality of candidate semantic place locations for the location report, the confidence score indicative of the likelihood that the location report occurred during a visit to the candidate semantic place location; and
   determining, by the one or more processors, that the location report corresponds to a high quality visit based at least in part on the confidence score for each of the plurality of candidate semantic place locations.

7. The method of claim 6, wherein the confidence score for each of the plurality of candidate semantic place locations is determined based at least in part on one or more signals indicative of semantic place location for the location report.

8. The method of claim 7, wherein the one or more signals indicative of semantic place location are based at least in part on one or more of a distance to the candidate semantic place location, search history, wireless network scans, social signals, or past location reports.

9. The method of claim 6, wherein the operation of determining, by the one or more processors, that the location report corresponds to a high quality visit comprises determining, by the one or more processors, that the location report corresponds to a high quality visit when the confidence score for one of the plurality of candidate semantic place locations is greater than a threshold confidence score to the plurality of other candidate semantic place locations.

10. A computing system, comprising:
    one or more processors; and
    one or more memory devices, the one or more memory devices storing computer-readable instructions that when executed by the one or more processors cause the one or more processors to perform operations, the operations comprising:
    obtaining a first location report associated with a first device;
    determining that the first location report corresponds to a high quality visit for a candidate semantic place location;
    generating a data point for a point cloud associated with the candidate semantic place location based at least in part on first location report; and
    associating the data point with the point cloud for the candidate semantic place location in the one or more memory devices;
    wherein the first location report is determined to correspond to a high quality visit when the first location report is determined to be associated with the candidate semantic place location greater than a threshold confidence score relative to a plurality of other candidate semantic place locations;

wherein determining that the first location report corresponds to a high quality visit for a candidate semantic place location further comprises:
identifying a plurality of candidate semantic place locations for the first location report;
determining a confidence score for each of the plurality of candidate semantic place locations for the first location report, the confidence score indicative of the likelihood that the first location report occurred during a visit to the candidate semantic place location; and
determining that the first location report corresponds to a high quality visit based at least in part on the confidence score for each of the plurality of candidate semantic place locations.

11. The computing system of claim 10, wherein the confidence score for each of the plurality of candidate semantic place locations is determined based at least in part on one or more signals indicative of semantic place location for the first location report, the one or more signals being based at least in part on a distance to the candidate semantic place location.

12. The computing system of claim 10, wherein the operation of determining that the first location report corresponds to a high quality visit comprises determining that the first location report corresponds to a high quality visit when the confidence score for one of the plurality of candidate semantic place locations is greater than a threshold confidence score relative to the plurality of other candidate semantic place locations.

13. The computing system of claim 10, wherein the operations further comprise:
receiving a second location report associated with a second device;
accessing the point cloud stored in the one or more memory devices; and
identifying a semantic place name visited by the second device based at least in part on the second location report and the point cloud.

14. The computing system of claim 13, wherein the semantic place name visited by the second device is identified based at least in part on a match between the second location report and the point cloud.

15. The computing system of claim 13, wherein the operation of identifying a semantic place name visited by the second device based at least in part on the second location report and the point cloud comprises:
accessing a pattern determined based at least in part on the point cloud, the pattern comprising a plurality of geographic cells, each geographic cell providing a probability value of being located at each of one or more semantic place names, the probability value being determined based at least in part on the one or more point clouds;
matching the second location report to one of the plurality of geographic cells; and
determining the semantic place name based at least in part on the probability value associated with the geographic cell matched to the second location report.

16. One or more tangible, non-transitory computer-readable media storing computer-readable instructions that when executed by one or more processors cause the one or more processors to perform operations, the operations comprising:
receiving a location report associated with a user device;
accessing data associated with one or more point clouds, each point cloud associated with a semantic place location, each point cloud generated from previously obtained location reports aggregated for a plurality of different devices, each point cloud comprising a plurality of data points, each of the plurality of data points corresponding to a high quality visit by one of the plurality of different devices to the semantic place location associated with the point cloud; and
identifying the semantic place name visited by the user device based at least in part on a match between the location report and the one or more point clouds;
wherein each high quality visit is identified, by the one or more processors, as a visit by one of the plurality of different devices that is determined to be associated with a candidate semantic place location with greater than a threshold confidence score relative to a plurality of other candidate semantic place locations.

17. The one or more tangible, non-transitory computer-readable media of claim 16, wherein the operation of identifying the semantic place name based at least in part on the location report associated with the user device and the one or more point clouds comprises:
accessing a pattern extracted from the one or more point clouds, the pattern comprising a plurality of geographic cells, each geographic cell providing a probability value of being located at each of one or more candidate semantic place names, the probability value being determined based at least in part on the one or more point clouds;
matching the location report to one of the plurality of geographic cells; and
determining the semantic place name based at least in part on the probability value associated with the geographic cell matched to the location report.

* * * * *